Patented Sept. 1, 1931

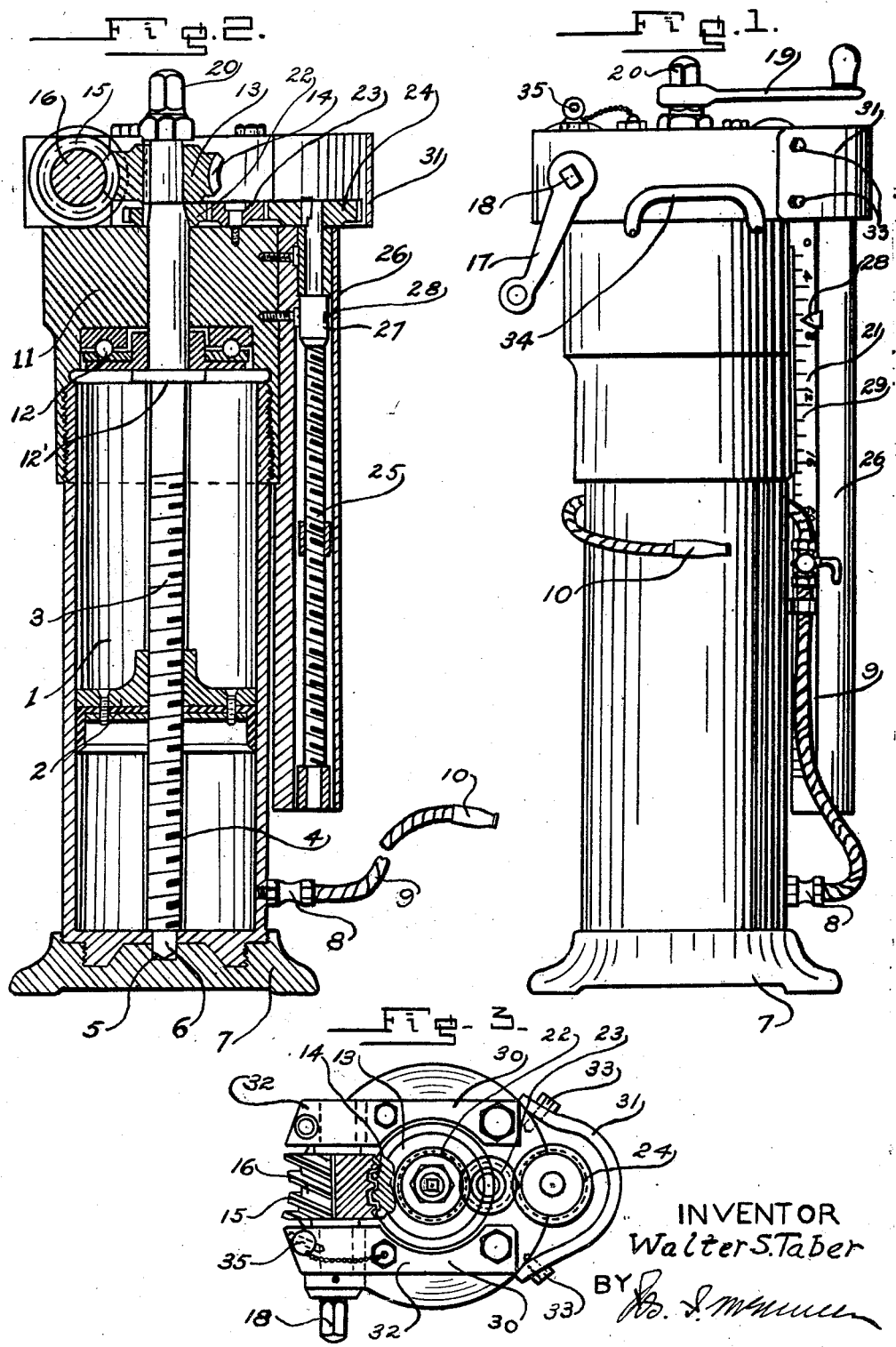

1,821,587

UNITED STATES PATENT OFFICE

WALTER S. TABER, OF HONOLULU, TERRITORY OF HAWAII

LUBRICANT DISPENSING DEVICE

Application filed August 7, 1929. Serial No. 384,226.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention relates to a force feed lubricant dispensing device and more particularly it is directed to that class of devices commonly called "grease guns" in which a lubricant such as grease may be forcibly injected into the bearings, grease cups, and between contacting, movable, or wearing parts of automobile mechanisms and the like.

One object of my invention is to provide a lubricant dispensing device which is so constructed that it can be quickly and easily filled with the lubricant and which will be immediately available for use.

Another object of my invention is to provide a lubricant dispensing device with means for producing either a high or low degree of pressure on the lubricant to force it into the desired places without disconnecting the means for producing the low pressure from the high pressure means.

Another object of my invention is to provide a lubricant dispensing device with a mechanism for causing the lubricant to be under a much greater pressure than that of the power required to operate the mechanism.

Still another object of my invention is to provide a lubricant dispensing device that is simple, compact, durable, efficient, satisfactory, and which has sufficient power to force the lubricant wherever found desirable.

In the usual type of grease guns now employed having means for putting the lubricant contained in such devices under either a high or low degree of pressure depending on the places to which the lubricant is to be applied it is necessary to disconnect the means for putting the lubricant under a high degree of pressure before the means employed for putting the lubricant under a low degree of pressure may be used or vice versa thus making the manufacture of the grease guns expensive to construct, and making the devices difficult to operate, complicated, and of insufficient power to force the lubricant into places difficult to penetrate.

It is therefore the aim and purpose of this invention to devise a lubricating dispensing device which is cheap to construct, easy to operate, efficient in use, accurate, and rapid in service, and which eliminates the loss of time resetting the gear connections used on some of the older forms of this type of device.

In order that my invention may be readily understood, reference is had to the accompanying drawings in which corresponding parts are indicated by the same reference characters and in which:

Fig. 1 shows a side elevation of a lubricating device illustrative of the invention, Fig. 2 is a longitudinal section of the same, and Fig. 3 is a top plan view of the invention partly in section.

In the illustrative embodiment of this invention 1 indicates a piston chamber in which the piston 2 of suitable construction is reciprocally moved by means of a screw threaded piston rod 3. The grooves 4 formed in the wall of the chamber 1 prevent rotation of the piston 2 during its longitudinal travel within the chamber. A centrally located opening 5 is formed in the closed lower end of chamber 1 which provides a bearing for the reduced end 6 of the piston rod 3. A base 7 is suitably attached to the chamber 1 which provides a support for the device when it is desired to stand it in an upright position. At the base 7 of the piston chamber 1 a conventional outlet nipple 8 is shown for customary connection to a flexible conduit 9 having a nozzle 10 attached to its free end.

The upper end of the piston chamber 1 is closed by a removable head 11 in which is mounted a thrust bearing 12 against which a collar 121 of the piston rod 3 is forced during operation of the dispensing device. The upper end of the piston rod 3 extends through said thrust bearing 12 and head 11 to form a driving connection with a gear 13 having multiple threads 14 which engage the multiple threads 15 of the driving worm 16. An operating crank 17 is attached to the extended end 18 of the multiple threaded worm 16. Another operating crank 19 is attached to the upper end 20 of the piston operating rod 3 which may be used for directly operating the piston rod 3 independently of the crank 17 due to the pitch of the multiple threaded worm and gear construction.

For the purpose of indicating the amount of lubricant used or remaining in the chamber 1 an indicator 21 is shown operatively connected to the piston rod 3 by means of gears 22 and 23 and pinion 24. A threaded rod 25 positioned in a suitable housing 26 is connected to the pinion 24 and adapted to rotate with the said pinion 24 said rod being provided with a collar or sleeve 27 to which is attached a pointer 28. Upon the turning of the rod 25 the sleeve is moved longitudinally thereon carrying the pointer 28 with it, thus indicating on a scale 29 the amount of lubricant which has been dispensed. For protecting the operator from contact with the gearing, yoke members 30 and guard member 31 are provided, the ends 32 of said yoke members providing bearings for the multiple threaded worm 16, the guard member 31 is positioned around the pinion 24 being attached to chamber 1 by any suitable means such as screws 33. Suitable handles 34 are provided on the device to make it portable. In order to lock the piston 3 in any given position, a detachable worm locking pin 35 is provided which cooperates with the worm and gear mechanism.

It is readily seen that the piston 2 may be driven to dispense lubricant at low pressure through the flexible conduit 9 by means of the directly connected crank 19. The pitch of the multiple threads on members 13 and 16 being sufficient to enable the member 13 to turn the member 16 which would not be the case if the multiple threads did not have enough pitch. On the other hand if a high pressure is desired in conduit 9 it may be attained by applying a small degree of power to the high power crank 17, the power being multiplied by means of the gear and worm members 13 and 16 respectively. This gives a high mechanical advantage and accordingly a high pressure in the compression chamber 1 to which conduit 9 is attached.

It will be apparent that the present invention broadly comprises a lubricant dispensing device in which a piston is operated by a screw threaded piston rod said rod being operated by a plurality of independently operable driving means, one of which driving means is directly connected to said screw threaded piston rod and another of which is connected with said piston rod through a multiple threaded gearing, the threads of said gearing having sufficient pitch to make the action of said gearing reversible upon the operation of said directly connected driving means, and more particularly in combination with means for locking said threaded gearing and with an indicator mechanism operable in synchronism with said piston rod.

Having thus described my invention what I claim as new and desire to secure by Letters Patent is:

1. In a mechanism of the kind described, the combination of a head, a screw threaded shaft journalled in said head and having one end thereof squared and projecting therefrom, a worm-wheel non-rotatably mounted on said shaft, a second shaft having one end thereof squared and a worm mounted thereon meshing with said worm-wheel, a piston having an internally threaded aperture therein meshing with the threads on said screw threaded shaft, and means for turning the squared ends of said shafts to actuate said worm-wheel on said screw threaded shaft to cause the said piston to travel on said screw threaded shaft.

2. In a mechanism of the kind described, the combination of a head, a screw threaded shaft journalled at one end in said head, a piston having an internally threaded aperture therein meshing with the threads of said screw threaded shaft and a plurality of driving means for turning said shaft to cause the said piston to travel on said screw threaded shaft, one of which driving means is directly connected to said shaft and another of which is connected to said shaft through reversible gearing.

3. In a mechanism of the kind described, the combination of a head, a screw threaded shaft journalled at one end in said head, a piston having an internally threaded aperture therein meshing with the threads of said screw threaded shaft and a plurality of driving means for rotating said shaft to cause the said piston to travel on said shaft, one of which driving means is directly connected to said shaft and another of which is connected to said shaft through worm gearing having threads of sufficient pitch to make said gearing reversible.

4. In a mechanism of the kind described, the combination of a head, a screw threaded shaft journalled at one end in said head, a worm-wheel non-rotatably mounted on said shaft, a piston having an internally threaded aperture therein meshing with the threads of said screw threaded shaft, and a plurality of driving means for rotating said shaft to cause said piston to travel on said screw threaded shaft, one of said driving means connected directly to said shaft and another connected to said shaft through a worm and worm-wheel, said worm and worm-wheel having threads of sufficient pitch to cause reversible action of said worm upon the operation of said directly connected driving means.

5. In a mechanism of the kind described, the combination of a head, a screw threaded shaft journalled at one end in said head, a piston having an internally threaded aperture therein meshing with the threads of said screw threaded shaft and high and low speed driving means for rotating said shaft to cause the said piston to travel on said screw threaded shaft, said high speed driving means being directly connected to said shaft and said low speed driving means including a worm-wheel and worm, the said worm-wheel being integral and rotatable with said shaft and said worm in permanent engagement with said worm-wheel for rotating said worm-wheel and shaft for causing the said piston to travel on said screw threaded shaft and operate said directly connected driving means, the threads on said worm-wheel and worm having sufficient pitch to cause reversible action of said worm upon the operation of said high speed driving means.

WALTER S. TABER.